(12) United States Patent
Ranta

(10) Patent No.: US 8,577,715 B2
(45) Date of Patent: Nov. 5, 2013

(54) PUSHED RINGTONES BASED ON DEVICE-SIDE CONTENT

(75) Inventor: Craig Ranta, Waterloo (CA)

(73) Assignee: BlackBerry Limited, Waterloo (CA)

( * ) Notice: Subject to any disclaimer, the term of this patent is extended or adjusted under 35 U.S.C. 154(b) by 505 days.

(21) Appl. No.: 12/395,027

(22) Filed: Feb. 27, 2009

(65) Prior Publication Data

US 2010/0223095 A1 Sep. 2, 2010

(51) Int. Cl.
*G06Q 10/00* (2012.01)
*G06Q 30/00* (2012.01)

(52) U.S. Cl.
USPC ...................................................... 705/7.31

(58) Field of Classification Search
USPC .............................. 705/7.29, 7.31
See application file for complete search history.

(56) References Cited

U.S. PATENT DOCUMENTS

| | | | | |
|---|---|---|---|---|
| 4,870,579 | A * | 9/1989 | Hey | 705/7.31 |
| 6,275,811 | B1 * | 8/2001 | Ginn | 705/14.41 |
| 7,233,658 | B2 | 6/2007 | Koser et al. | |
| 2002/0078056 | A1 * | 6/2002 | Hunt et al. | 707/100 |
| 2004/0109558 | A1 * | 6/2004 | Koch | 379/373.01 |
| 2005/0119033 | A1 * | 6/2005 | Fan et al. | 455/567 |
| 2005/0175161 | A1 * | 8/2005 | Reynolds et al. | 379/88.17 |
| 2006/0121949 | A1 * | 6/2006 | Awada et al. | 455/567 |
| 2006/0147002 | A1 * | 7/2006 | Desai et al. | 379/100.06 |
| 2006/0280036 | A1 * | 12/2006 | Hegarty | 368/73 |
| 2007/0010195 | A1 * | 1/2007 | Brown et al. | 455/3.06 |
| 2007/0047523 | A1 | 3/2007 | Jiang | |
| 2007/0127707 | A1 * | 6/2007 | Koser et al. | 379/373.03 |
| 2007/0220103 | A1 * | 9/2007 | Rogers et al. | 709/217 |
| 2008/0159522 | A1 * | 7/2008 | Ericson | 379/373.02 |
| 2008/0167968 | A1 * | 7/2008 | Cue et al. | 705/26 |
| 2012/0034903 | A1 * | 2/2012 | Kupsh et al. | 455/412.2 |

FOREIGN PATENT DOCUMENTS

| | | |
|---|---|---|
| EP | 0999691 A1 | 5/2000 |
| EP | 1613028 A2 | 1/2006 |
| WO | 2006135592 A1 | 12/2006 |
| WO | 2008080021 A2 | 7/2008 |

OTHER PUBLICATIONS

European Search Report issued by the European Patent Office dated Jul. 13, 2009 for corresponding European Patent Application No. 09154019.5.

Park, Will; "Emotive's Push-Ringtones—Caller Decides What Ringtone You Hear"—Apr. 21, 2007; http://www.intomobile.com/2007/04/21/emotives-push-ringtones-caller-decides-what-ringtone-you-hear.html.

(Continued)

*Primary Examiner* — Seye Iwarere
(74) *Attorney, Agent, or Firm* — Gowling Lafleur Henderson LLP

(57) ABSTRACT

A ringtone service distributes selected ringtones to respective communication devices in a communication network. A particular ringtone for a respective communication device is selected is in accordance with at least one recommendation operation and ringtone selector data. The selector data is generated from user data associated with the particular communication device from which to make implicit observations of user behavior for predicting how a user will like a particular ringtone. A media purchase link, provided with the ringtone, assists with the purchase of an associated media file from a media purchase service. A ringtone may comprise a sample from a source (e.g. an audio or video recording) and the associated medial file may comprise a copy of the source.

13 Claims, 6 Drawing Sheets

(56) References Cited

OTHER PUBLICATIONS

"Musiwave Smart Radio Service Selected by 3 Italia"; Feb. 13, 2007; http://www.mp3.fr/MW_press_release_details.php?idrelease=81.

Canadian Office Action dated May 16, 2012 issued by the Canadian Intellectual Property Office relating to Canadian Patent Application No. 2,693,741.

Canadian Office Action dated Feb. 27, 2012 issued by the Canadian Intellectual Property Office relating to Canadian Patent Application No. 2,693,741.

Canadian Office Action dated Nov. 27, 2012, for corresponding Canadian Patent Application No. 2,693,741 filed Feb. 17, 2010.

The 2nd Office Action issued by Chinese Patent Office dated Nov. 12, 2012, for corresponding Chinese Patent Application No. 201010124350.0 with an English translation thereof.

European Examiners Report dated May 22, 2013, for corresponding European Patent Application No. 09 154 019.5 filed Feb. 27, 2009.

\* cited by examiner

PUSHED RINGTONES BASED ON DEVICE-SIDE CONTENT

FIELD

The present description relates generally to a providing ringtones to communication devices such as wireless mobile devices in a communication network.

BACKGROUND

Communication devices including wireless mobile devices (e.g. smart phones, PDAs, appliances, etc.) may be configured for voice, data or combined voice and data communications capabilities and are commonly used for personal and business communications. Often such devices are configured with personal information managers incorporating calendar, contact manager (address book), note taking, and journal functions. The devices may also provide other capabilities such as a web browser and a media player, among others. To notify a device user of an event, such as an incoming telephone call, an appointment reminder, a new email message, a low battery warning, etc., one or more of an audible, a visible and a tactile signal may be output. A customizable sound for a notification may be defined by a ringtone comprising data coding the sound. Notification profiles may be established for controlling notifications, for example, to define different notification modes, such as Loud, Vibrate, Quiet, etc.

BRIEF DESCRIPTION OF THE DRAWINGS

One or more embodiments will now be described by way of example only with reference to the following drawings in which.

For convenience, like numerals in the description refer to like structures in the drawings.

DETAILED DESCRIPTION

Figure 1:
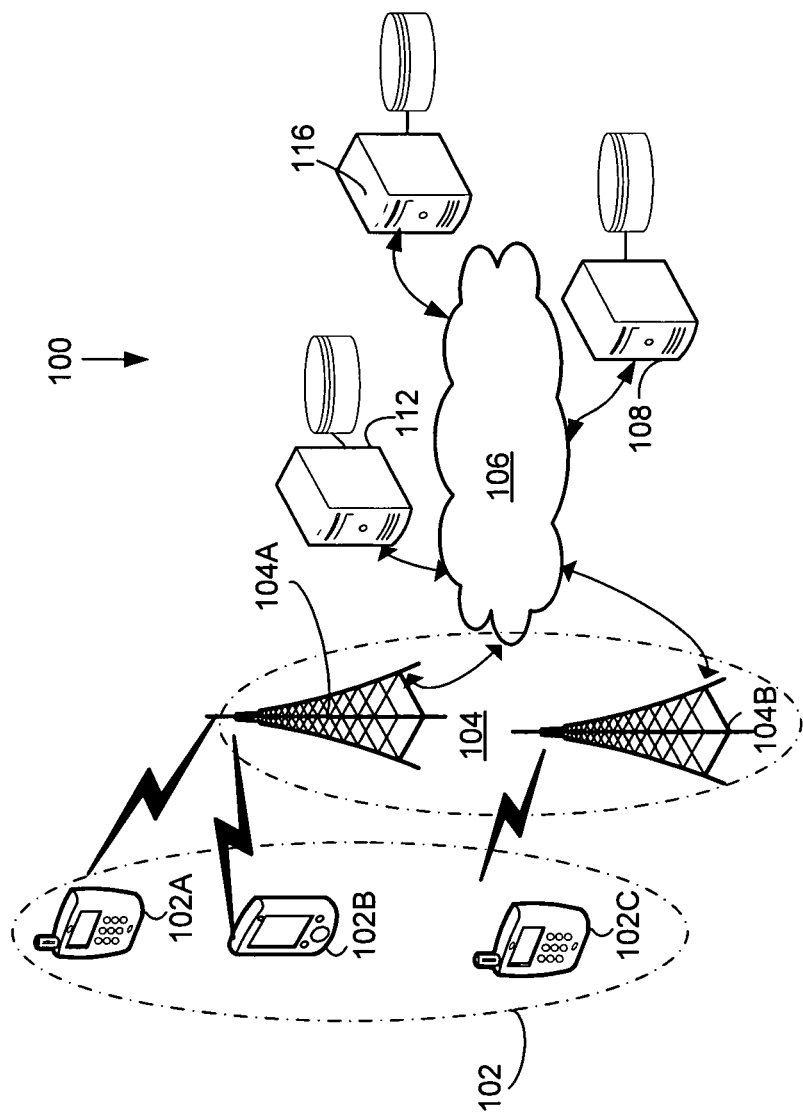
FIG. 1 is a block diagram showing an example communication network.

Users often desire new ringtones and media (e.g. songs or other recordings) for their devices and further desire convenient services for providing these to their devices. A ringtone service distributes selected ringtones to respective communication devices in a communication network. A particular ringtone for a respective communication device is selected is in accordance with at least one recommendation operation and ringtone selector data. The selector data is generated from user data associated with the particular communication device from which to make implicit observations of user behavior for predicting how a user will like a particular ringtone. A media purchase link, provided with the ringtone, assists with the purchase of an associated media file from a media purchase service. A ringtone may comprise a sample from a source (e.g. an audio or video recording) and the associated medial file may comprise a copy of the source.

In one embodiment there is provided a method of communicating ringtones to a communication device. The method comprises sending ringtone selector data to a ringtone service for selecting a ringtone in accordance with at least one recommendation operation, said selector data generated from user data associated with the communication device; and receiving a ringtone selected in accordance with the ringtone selector data for notifying a user of a communication device event.

The method may comprise receiving a media purchase link in association with the ringtone for assisting with a purchase of a media file. In such a case, the method may comprise using the media purchase link to purchase and receive the media file.

The method may comprise generating the ringtone selector data.

The communication device may comprise a wireless communication device configured for receiving data services from a communication network server. As such, the method may comprise performing the steps of generating, sending and receiving on behalf of the communication device by the communication network server and further comprises forwarding the ringtone to the communication device by the communication network server.

User data may comprise one or more of a plurality of media files, browser history and a plurality of messages. Generating the ringtone selector data may comprise selecting user data from which to make implicit observations of user behavior for predicting the user's behavior in relation to a particular ringtone.

The communication device may comprise a wireless communication device and the method may comprise receiving the ringtone via a wireless network in accordance with a push communication.

In accordance with an embodiment, there is provided a communication device for receiving ringtones from a ringtone service, the communication device comprises a processor and a memory coupled thereto, said memory storing instructions and data configuring the processor to: send ringtone selector data to the ringtone service for selecting a ringtone in accordance with at least one recommendation operation, said selector data generated from user data associated with the communication device; and receive a ringtone selected in accordance with the ringtone selector data for notifying a user of a communication device event.

The processor may be configured to receive a media purchase link in association with the ringtone for assisting a purchase of a media file. As such, the processor may be configured to use the media purchase link to purchase and receive the media file.

The processor may be configured to generate the ringtone selector data. Generating the ringtone selector data may comprise selecting user data from which to make implicit observations of user behavior for predicting the user's behavior in relation to a particular ringtone.

The processor may be configured to generate notifications of communication device events in accordance with at least one notification profile and further configured to use the ringtone to generate a notification in accordance with the at least one profile.

In another embodiment there is provided a computer program product storing instructions and data to configure a processor to perform any of the method embodiments.

In an embodiment, there is provided a method of providing a ringtone service for communicating ringtones to a communication device comprising: receiving ringtone selector data for selecting a ringtone in accordance with at least one recommendation operation, said selector data generated from user data associated with the communication device; selecting a ringtone in accordance with the recommendation operation and ringtone selector data; and sending the ringtone for use by the communication device to notify a user of a communication device event. The method may comprise sending a media purchase link in association with the ringtone for assisting a purchase of a media file. The method may comprise performing at least one recommendation operation to select a particular ringtone from a store of ringtones utilizing a collaborative filter and implicit observations of user behavior from the ringtone selector data. The method may comprise maintaining a store of ringtones from which to select.

In another embodiment, there is provided a method of purchasing a media file comprising: receiving a ringtone and associated media file purchase link at a communication device, said link associated to a media file for purchase through a media purchase service, the ringtone and associated media file selectively communicated to the communication device in accordance with at least one recommendation operation and ringtone selector data generated from user data associated with the communication device from which to make implicit observations of user behavior for predicting the user's behavior in relation to a particular ringtone; invoking the media purchase service using the media file purchase link; and purchasing and receiving the media file using the communication device.

In another embodiment, there is provided a system for distributing ringtones to communication devices comprising: a communication network; a ringtone server communicatively coupled to the network, said server configured to communicate ringtones for presentation to users of communication devices, selecting a particular ringtone for a particular communication device in accordance with at least one recommendation operation and ringtone selector data generated from user data associated with the particular communication device from which to make implicit observations of user behavior for predicting the user's behavior in relation to a particular ringtone; and a plurality of communication devices communicatively coupled to the network and configured to communicate with the server to receive the ringtones.

Referring to FIG. 1, an example communication network 100 is illustrated in accordance with a present embodiment. Communication network 100 comprises a plurality of mobile wireless communication devices 102A, 102B and 102C, (collectively 102). The devices are coupled for wireless communication via a wireless communication network 104 represented by radio towers 104A and 104B. Network 104 is coupled to a interconnection communication facilities 106. Such facilities 106 may be configured as a local area network, wide area network such as the public Internet or combinations thereof. For example, network 104 may be coupled to other networks such as the public switched telephone network (PSTN) via network infrastructure (all not shown).

Via facilities 106 (or other private or public networks (not shown)), various informational sources (e.g. servers) may be coupled for communication. The servers may communicate among each other, with mobile devices 102 or among all. There is illustrated a server 108 providing mobile device administration (hereinafter MDAS 108), providing data communication services and generally managing operations of devices 102. There is provided a server 112 for wireless network service control (hereinafter carrier server 112) and a server 116 for serving ringtones (hereinafter "ringtone push server"), in accordance with a present embodiment, for pushing ringtones based on device-side content. Each server 108, 112 and 116 is coupled to a respective data store.

A particular device 102A may comprise one of various computing devices such as a desktop computer, a laptop or other portable computer, a smart phone, a personal digital assistant (PDA), and the like configured for wireless communication via network 104. For simplicity, only some selected network infrastructure (e.g. for wireless carriers and enterprises, including gateways, firewalls, etc.) is shown.

In the present embodiment, the operation of mobile devices 102 may be at least in part under the control of MDAS 108. MDAS 108 provides and enforces usage and other policies on mobile devices 102. Policies may specify which software applications a particular device may use, the services available to those applications and how such applications and services may operate (e.g. through parameters and other configuration of the policies). Example software applications may comprise various data communication or messaging applications such as email, Instant Messaging, SMS, Internet browsing, WAP, push-based messaging and publish/subscribe message services, among others. In some embodiments, MDAS 108 may be hosted and operated in an enterprise context, such as a business or other organization, for group administration of enterprise users. MDAS may also provide devices 102 with data communications services, for example, providing an email proxy and a messaging agent to communicate email to and from such devices 102, synchronizing such communications with one or more email accounts for the user. MDAS may also provide proxy and gateway services to enable and control communications (for example, browsing or other HTTP communications) via public and private networks such as the Internet or an enterprise LAN.

Ringtone push server 116 may be configured to communicate (e.g. in accordance with push-based protocols) ringtones to devices 102. A particular ringtone may be pushed to a particular device in response to device-side content, such as, one or more of image, audio and video content, browser history, message content, etc. The device-side content (i.e. user data) may be stored locally to a device (e.g. 102A) or remotely on its behalf, such as, in association with MDAS 108. Each of the devices 102 (or MDAS 108 on their respective behalves) may communicate to ringtone push server 116 ringtone selector data determined from a review of the respective user data associated with the device. Ringtone push server 116 may apply a suggestion or matching algorithm to the respective selector data to determine a ringtone to be communicated to a particular device (e.g. 102A) the device. Ringtone selector data may be communicated to ringtone push server 116 periodically. In one embodiment, the ringtone selector data is communicated (i.e. pulled) from a device (e.g. 102A or 108) to ringtone push server 116 in response to a request.

Ringtones may be selected and communicated periodically (i.e. pushed) to the devices to "update" the ringtone on the device. In one embodiment, the ringtone may be pushed in association with another network communication such as an incoming telephone call.

In an embodiment, a ringtone may comprise an audio recording of a song (or part thereof) in a common format such as MP3, AAC, WMA, among others. Such ringtones are sometimes referred to as "truetones", "realtones", "realtunes" or "mastertones". In an embodiment, a ringtone may comprise an audio recording of spoken word, music or other audio from a television (TV) program, film, video, speech, (or part thereof) in a common format such as MP3, AAC, WMA, among others.

Ringtone push server 116 may communicate a ringtone in association with a link (e.g. URL) to a media file for assisting with a purchase of the media file. For example, if the user likes the ringtone, the user may wish to purchase the associated media file. The media file may comprise a source of the ringtone (e.g. an audio or video recording of the song, TV program, film, etc.) or may otherwise be associated with the ringtone. Ringtone push server 116 (or another server (not shown)) may be configured to provide a media purchase service, to receive purchase requests, conduct a purchase transaction and send the media file.

Figure 2:
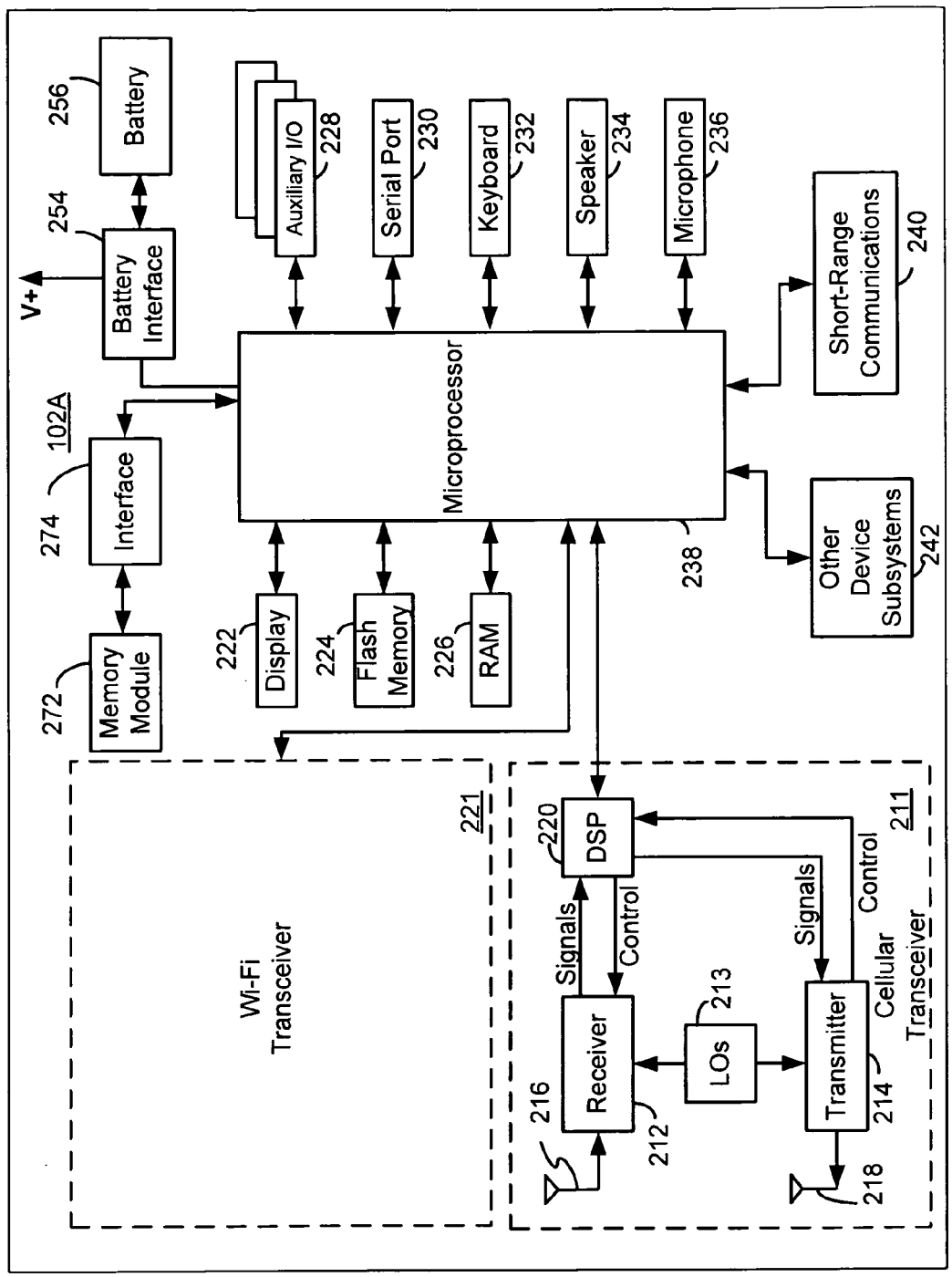
FIG. 2 is a block diagram of a wireless mobile device in accordance with an embodiment.

FIG. 2 is a detailed block diagram of an embodiment of a handheld wireless communication device 200 that may be configured as one of mobile devices 102 as described. Handheld device 200 may be a two-way communication device having at least voice and advanced data communication capabilities, including the capability to communicate with other computer systems. Depending on the functionality provided by handheld device 200, it may be referred to as a data messaging device, a two-way pager, a cellular telephone with data messaging capabilities, a wireless Internet appliance, personal digital assistant (PDA), smart phone, BlackBerry® or a data communication device (with or without telephony capabilities).

Handheld device 200 may incorporate a cellular transceiver (communication subsystem) 211, which includes a receiver 212, a transmitter 214, and associated components, such as one or more (e.g. embedded or internal) antenna elements 216 and 218, local oscillators (LOs) 213, and a processing module such as a digital signal processor (DSP) 220. The particular design of communication subsystem 211 depends on the communication network in which handheld device 200 is intended to operate.

Handheld device 200 may send and receive communication signals over the network 104 after required network registration, authentication or activation procedures have been completed. Signals received by antenna 216 through the network are input to receiver 212, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of handheld device 200 and handheld device 200 may comprise a memory module 272, memory module card or a Removable User Identity Module (R-UIM) or Subscriber Identity Module (SIM/USIM), to be inserted in or connected to an interface 274 to facilitate operation in applicable networks (e.g. 104). Alternatively, memory module 272 may be a non-volatile memory that is programmed with configuration data by a service provider so that mobile station 200 may operate in the network. Since handheld device 200 is a mobile battery-powered device, it also includes a battery interface 264 for receiving one or more (rechargeable) batteries 266. Such a battery 266 provides electrical power to most if not all electrical circuitry in handheld device 200, and battery interface 264 provides for a mechanical and electrical connection for it. The battery interface 264 is coupled to a regulator (not shown in FIG. 2) that provides power V+ to all of the circuitry.

Handheld device 200 may include a Wi-Fi transceiver 221 that may comprise similar components/chipsets to subsystem 211 adapted for one or more Wi-Fi protocols. Though Wi-Fi is shown, WiMAX is one alternative transceiver. In some embodiments, device 200 may be capable of both Wi-Fi and WiMAX communications in accordance with software-defined radio ("cognizant radio") techniques.

Handheld device 200 includes a microprocessor 238 that controls its overall operation. Communication functions, including at least data and voice communications, are performed through communication subsystem 211. Microprocessor 238 also interacts with additional device subsystems such as an LCD or other display device 222, a flash memory 224, a random access memory (RAM) 226, auxiliary input/output (I/O) subsystems or devices 228 (e.g. a camera), a serial port 230, a keyboard 232, at least one speaker 234, a microphone 236, a short-range communications subsystem 240, and any other device subsystems (e.g. removable media) generally designated at 242.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element (not shown). Operating system, specific device applications or parts thereof, may be temporarily loaded into a volatile store such as RAM 226.

Microprocessor 238, in addition to its operating system functions, may enable execution of software applications on handheld device 200. A predetermined set of applications that control basic device operations, including at least data and voice communication applications, will normally be installed on handheld device 200 during its manufacture. An application that may be loaded onto handheld device 200 may be a personal information manager (PIM) application having the ability to organize and manage data items relating to a user such as, but not limited to, e-mail, calendar events, voice mails, appointments, and task items. Naturally, one or more memory stores are available on handheld device 200 and memory module 272 to facilitate storage of PIM data items and other information.

The PIM application may have the ability to send and receive data items via the wireless network. In an embodiment, PIM data items are seamlessly integrated, synchronized, and updated via the wireless network, with the mobile station user's corresponding data items stored and/or associated with a host computer system (e.g. via MDAS 108) thereby creating a mirrored host computer on handheld device 200 with respect to such items. This is especially advantageous where the host computer system is the mobile station user's office or enterprise computer system. Additional applications may also be loaded onto handheld device 200 through network, an auxiliary I/O subsystem 228, serial port 230, short-range communications subsystem 640, or any other suitable subsystem 242, and installed by a user in RAM 226 or a non-volatile store (e.g. 224) for execution by microprocessor 238. Such flexibility in application installation increases the functionality of handheld device 200 and may provide enhanced on-device functions, communication-related functions, or both. For example, secure communication applications may enable electronic commerce functions and other such financial transactions to be performed using handheld device 200.

In a data communication mode, a received signal such as a text message, an e-mail message, Web page download, or ringtone will be processed by applicable communication subsystem 211 or 221 and input to microprocessor 238. Microprocessor 238 may further process the signal, in accordance with an associated application, for output to display 222 or alternatively to auxiliary I/O device 228. A user of handheld device 200 may also compose data items in accordance with an associated application, such as e-mail messages, for example, using keyboard 232 in conjunction with display 222 and possibly auxiliary I/O device 228. Keyboard 232 may be a complete alphanumeric keyboard and/or telephone-type keypad. These composed items may be transmitted over a communication network through communication subsystem 211 or 221.

For voice communications, the overall operation of handheld device 200 is substantially similar, except that the received signals would be output to speaker 234 and signals for transmission would be generated by microphone 236. Alternative voice or audio I/O subsystems, such as a voice message recording subsystem, may also be implemented. Although voice or audio signal output may be accomplished primarily through speaker 234, display 222 may also be used to provide an indication of the identity of a calling party, duration of a voice call, or other voice call related information, as some examples.

Serial port 230 in FIG. 2 may be implemented in a personal digital assistant (PDA)-type communication device for which synchronization with a user's desktop computer as a desirable, albeit optional, component. Serial port 230 enables a user to set preferences through an external device or software application and extends the capabilities of handheld device 200 by providing for information or software downloads to handheld device 200 other than through a wireless communication network. The alternate download path may, for example, be used to load an encryption key onto handheld device 200 through a direct and thus reliable and trusted connection to thereby provide secure device communication.

Short-range communications subsystem 240 is an additional optional component that provides for communication between handheld device 200 and different systems or devices, which need not necessarily be similar devices. For example, subsystem 240 may include an IR transceiver and associated circuits and components, or a Bluetooth™ communication module to provide for communication with similarly enabled systems and devices.

Figure 3:
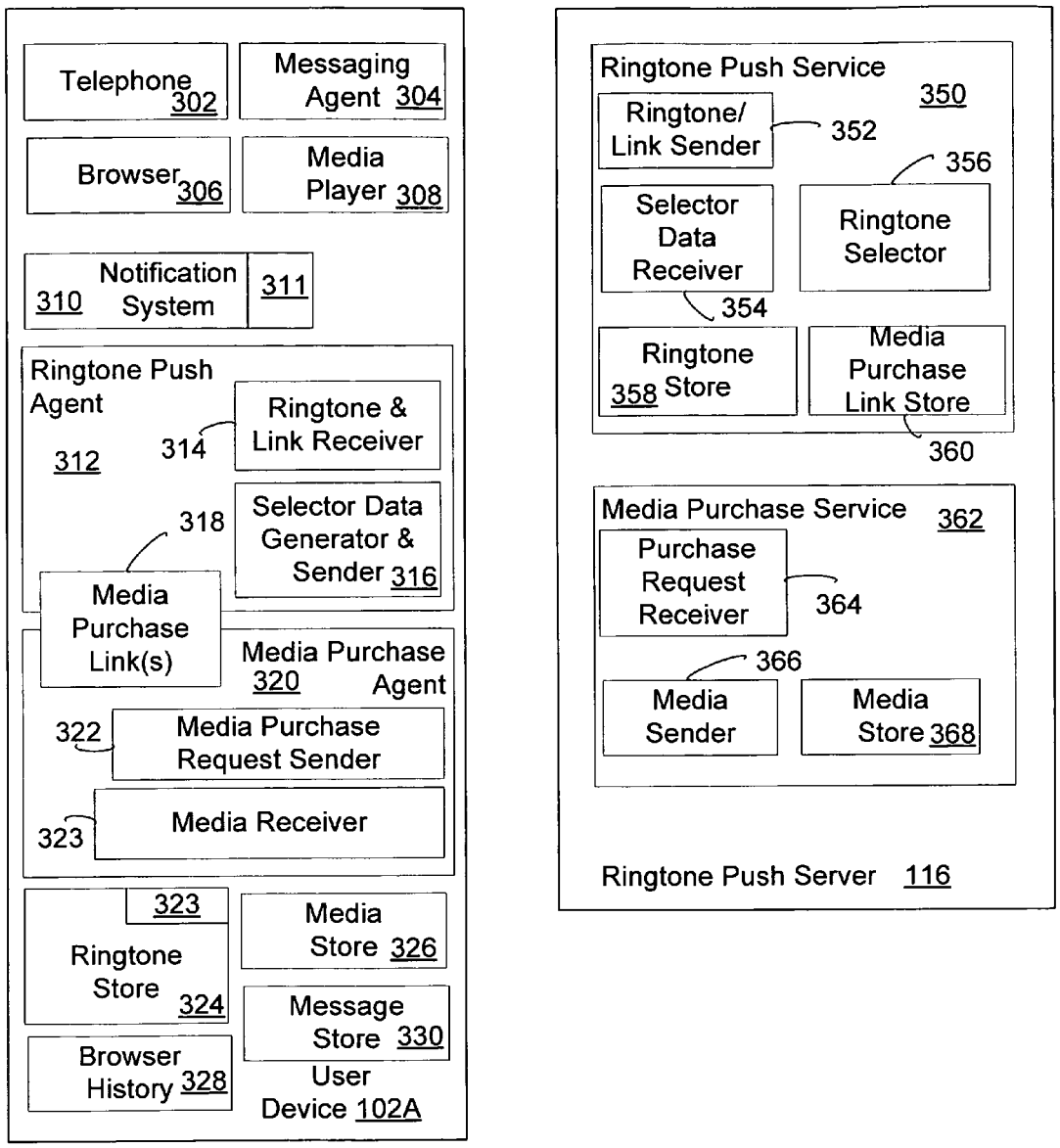
FIG. 3 is a block diagram of components of the communication network of FIG. 1 showing logical components and data for operations of a ringtone push system in accordance with an embodiment thereof.

FIG. 3 illustrates, in accordance with an embodiment thereof, a block diagram of selected components (i.e. device 102A and ringtone push server 116) of communication network system of FIG. 1. FIG. 3 shows respective logical component or modules (e.g. computer software instructions and data) for operation of the ringtone push service.

A view of a run-time and/or persistent store (such as RAM 226 or flash memory 224) of device 102A comprises, broadly, modules for voice and data communication (e.g. 302, 304, 306) and media playback (308) as well as data stores therefor (324, 326, 328 and 330) and a notification system 310 for notifying a user of events. In accordance with an embodiment, there is further provided modules 312 and 320 for ringtone push services and media purchasing.

User device 102A comprises telephone module 302 for conducting voice communications. Telephone module 302 provides a user interface (not shown) for initiating and receiving calls.

User device 120A further comprises a messaging agent 304, having a user interface (not shown), for conducting data communications. In a present embodiment, messaging agent is configured for email communications comprising text. Messages may be stored in message store 330. Messaging agent 304 (or other agents (not shown)) may be configured for SMS, MMS, Instant Messaging or other data messaging. Though not shown, messages may comprise one or more attachments, including but not limited to word processing or spreadsheet documents or media files. Such may also be stored in message store 330 or otherwise to user device 102A. As further described below, such user data may be examined to generate selector data for selecting one or more ringtones to be pushed to device 102A.

A media player 308 presents (e.g. plays) media files comprising image, audio or video content. Media files may be stored in media store 326. Media playback may be organized using playlists (not shown) to play selected groups of one or more media files. Media files comprise coded data in accordance with various protocols or standards. For example, one popular standard for coding audio in a media file is the MP3 standard. A media file may also comprise one or more properties providing or linking to associated data for the coded content. Associated data for an audio recording coded in a media file may include one or more of: song title, artist, album, genre, composer, time, play count, last played, rating, parental rating, album art, etc. Similarly, properties may be provided for image and video content files. User data in media files (especially the associated properties), playlists etc. may be examined to generate selector data for selecting one or more ringtones to be pushed to device 102A. User device 102A comprises a browser agent 306 configured for browsing data via one or more public or private networks using HTTP, other protocols or both. Browser activity, such as the visiting of particular pages, may be recorded in data representing browser history stored to browser history store 328. User data in browser history may be examined to generate selector data for selecting one or more ringtones to be pushed to device 102A.

User device 102A may further comprise a PIM comprising an address book, calendar, task, notes and other productivity and collaboration modules (not shown). User data associated therewith may be examined to generate selector data for selecting one or more ringtones to be pushed to device 102A. Events associated therewith may be generated and notified to the user. Also not shown is an operating system or other modules providing device status monitoring functions such as a battery life monitor, network coverage monitor, or other device resource use monitor. Events associated therewith may be generated and notified to the user.

During operation of the various modules, (e.g. messaging agent 304, telephone module 302, calendar, etc.) events may be generated or otherwise triggered. A user of device 102A may desire to be notified of such events. An event may comprise an incoming telephone call, a new message, an appointment reminder, a low battery warning, etc. Notification system 310 may be configured to provide user notification of events via one or more output devices (e.g. via one or more of 222, 234 and 228) of device 102A. Notification may be configured using one or more profiles 311. In a present embodiment, notification system 310 may invoke the presentation (e.g. playback) of a ringtone 323 from store 324.

User device 102A further comprises ringtone push agent 312 for receiving one or more ringtones (e.g. 323) and one or more associated respective media purchase links (URLs) (e.g. 318) from the ringtone push service. Particular ringtones are selected for communicating (i.e. pushing) to the user device 102A in response to selector data generated through the examination of user data in accordance with module 316. User data may include browser history, media files and playlists, messages, documents, etc. associated with the device 102A. User data may be stored to the device or remotely such as on behalf of the device (see FIG. 5).

Periodically, selector data generator & sender 316 may examine user data to locate data of interest with which to facilitate ringtone selection, to build a user's profile. Operations select user data from which to make implicit observations of user behaviour for predicting how a user will like a particular ringtone. In one embodiment the selector data generator employs implicit data collection. For example, by obtaining a list of items (e.g. media files) that a user has stored in association with the user's device 102A, by examining a user's patterns or habits within browser history, messages, etc.

By way of example, module 316 may gather playlists or properties data associated with media files from media store 326. The located data may be provided as is or may be reviewed and aggregated before sending to the ringtone push service. Rather than defining and sending selector data as a list of media file song titles, module 316 may examine the associated properties and generate aggregated data such as a count of songs by different genres to provide a relative interest measure. In one embodiment, the selector data may comprise the top "N" artists from the media files. In another embodiment, the selector data may comprise the top "X" song titles according to the number of times each has been played.

Selector data generation operations may examine other data including browser history, messages and documents. Examination may employ keywords or other information (e.g. built up from media file meta data) or websites identified (flagged) as being a media-type (i.e. streaming audio/video). Relevant data for constructing a profile or prediction model is gathered based on music pages viewed, for example. This can be used to rate the user's preference (if the user writes or visits sites with "Artist 1" more often than "Artist 2" then "Artist 1" would get a higher score) in the profile or model.

Ringtone push agent 312 comprises a ringtone and media link receiver 314 for receiving ringtones and media purchase links from the remote service. Ringtone and media link receiver 314 may be configured to store the ringtone 323 to store 324 or otherwise make the ringtone 323 available to notification system 310. A ringtone so received may replace a previously received ringtone yet leave still other ringtones in store 324 unaffected. Notification system 310 (and or telephone module 302) may be configured to use multiple ringtones. For example, a user may assign different respective particular ringtones to respective known callers. A pushed ringtone from service 350 may be stored for use to notify a user of an incoming call from an unknown caller.

As described previously, a ringtone 323 may comprise a sample of an audio recording such as a song and media purchase link 318 may comprises a link (e.g. URL) to purchase a media file embodying the audio recording. However, a ringtone 323 need not be restricted to an audio recording and may comprise video or an image and notification system 310 may be configured accordingly.

Media purchase links 318 may be shared with a media purchase agent 320. Media purchase agent 320 facilitates the purchase of one or more media files associated with a particular ringtone from a remote media purchase service. Purchase agent 320 comprises a media purchase request sender 322 which may be invoked using link 318 to identify the media file of interest to the remote service. A media receiver 323 is provided for receiving a purchased media file. The purchased media file may be stored to media store 326. Though shown as an independent module, media purchase agent 320 may cooperate with other modules, for example, browser 306 or an electronic wallet module (not shown) or both for facilitating e-commerce transactions securely.

In a present embodiment, for convenience, ringtone push server 116 facilitates both ringtone push services and media purchase services and comprises a ringtone push service module 350 and media purchase service module 362. Though shown together on a single server, module 350 and 362 may be hosted on separate servers and may be provided by separate commercial entities. Functions and features of the services are not shown for simplicity. For example, ringtone push service may be a subscription service whereby an account may be established and a user device enrolled to receive pushed ringtones. Similarly, e-commerce aspects of media purchase service are simplified.

Push service module 350 comprises a ringtone and media purchase link sender 352 and a selector data receiver 354. Push service module 350 further comprises a ringtone selector 356, a ringtone store 358 and a media purchase link store 360. In the present embodiment, push service module 350 receives selector data generated from user data associated with device 102A.

Ringtone selector module applies recommendation operations to automatically select a ringtone (e.g. 323) in accordance with the selector data. The selector data may be operated upon by a recommendation algorithm, such as those employing collaborative filtering or determining item-to-item similarities, for comparing or matching to data associated with what other users have done to select a ringtone from store 358 in accordance with a prediction of what the device 102A user might like. For example, a recommendation algorithm may receive selector data comprising an artist and song title and recommend a different song that other user's who have that song or artist also have or recommend. Ringtone selector 356 selects a ringtone in accordance with the recommendation for communicating to device 102A via sender 352 with an associated media purchase link from store 360. In an alternative embodiment, purchase links may not be stored per se in store 360 but may be generated dynamically.

Media purchase service 362 comprises a purchase request receiver 364, media sender 366 and a media store 368. Receiver 364 receives a request to purchase a media file such as a request invoked using a media purchase link 318. A purchase may be conducted, for example, negotiating and concluding a contract to purchase the media file. Media sender 366 sends the media file from store 368 in accordance with the purchase. Though not shown, statistics from media purchases may be useful to assist with collaborative filter data generation and the recommendation algorithm.

Figure 4A:
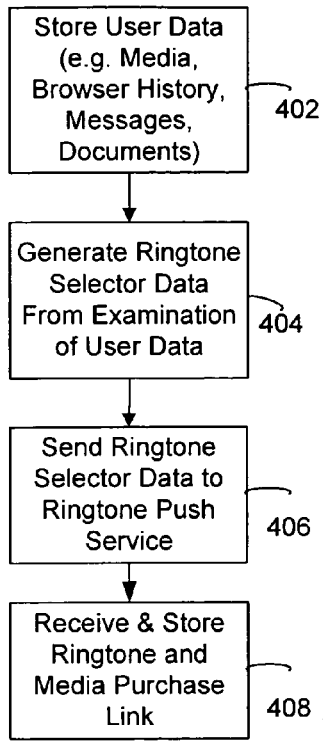
FIGS. 4A-4E are flow charts of operations of the ringtone push system of FIG. 3 in accordance with an embodiment.

FIGS. 4A-4E illustrates flow charts of operations of device 102A and server 116 in accordance with an embodiment. FIG. 4A illustrates operations of device 102A. At step 402 user data (e.g. media files, browser history, messages, documents etc.) is stored to device 102A. At step 404, selector data generator and sender 314 examines the user data and generates the selector data. Though not shown, the examination and/or generation operations may generate and persist (i.e.

store) associated user profile or prediction data or metadata for building a prediction model. This additional data may be used in subsequent operations (e.g. repeats of step 404 with subsequent user data). For example, certain metadata may be generated and used for examining (i.e. matching to) subsequent user data such as browser history, messages or documents. At step 406 the selector data is sent to ringtone push service 350 at server 116. A ringtone 323 and a media purchase link 318 are received and stored (step 408).

In a present embodiment, the steps of FIG. 4A need not be performed singularly and in a linear fashion. Some steps may be performed more than once before others are performed. For example, step 402 may be performed many times before selector data is generated. Selector data may be generated (step 404) periodically (e.g. weekly or in accordance with a schedule) so as to examine user data that may have changed. Step 406 may be preformed in accordance with a request received from service 350 to pull the selector data. Step 408 may be performed in association with other operations (e.g. as shown in FIG. 4C) such as the receipt of an incoming telephone call.

Figure 4B:
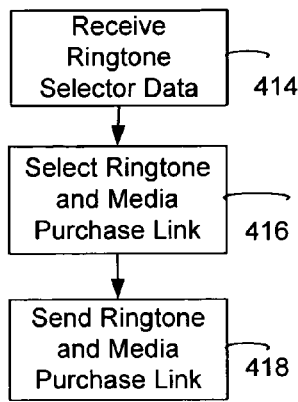

FIG. 4B illustrates operations of ringtone push server 116. At step 414 ringtone selector data for a device 102A is received. One or more ringtones and media purchase links are selected in accordance with the selector data and the recommendation algorithm (step 416). The ringtone and media are sent to the device (step 418). As noted, step 414 may be performed following a request to device 102A to provide the selector data. Ringtone 323 and media link 323 may be communicated (i.e. pushed) to the device through an intermediate server such as one associated with a carrier or network 104. For example, ringtone may be pushed in association with a network or other communication triggering an incoming call.

Figure 4C:
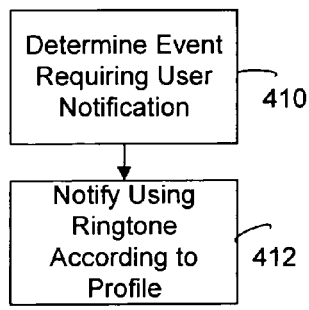

FIG. 4C illustrates operations of device 102A. At step 410, the occurrence of an event to be notified to a user is determined. At step 412, the ringtone is used to notify the user according to the profile 311.

Figures 4D, 4E:
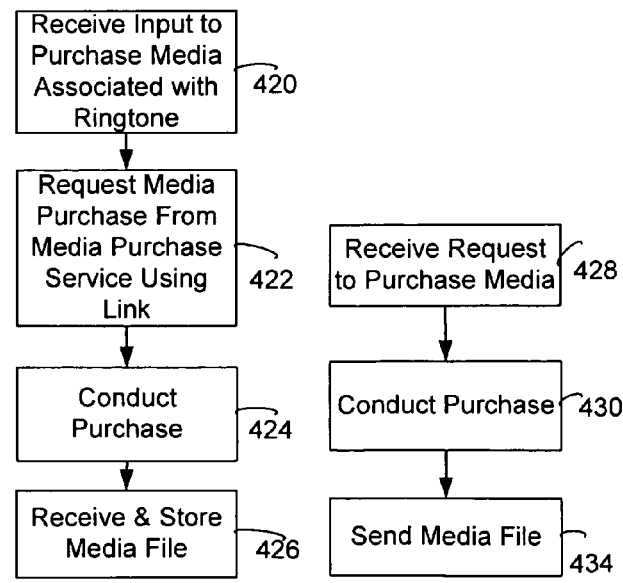

FIG. 4D illustrates operations of device 102A. At step 420 input to purchase media associated with a ringtone (i.e. via link 318) is received. A request to the media purchase service is sent (step 422). A purchase is conducted, for example, providing or confirming payment information, etc. (step 424). At step 426, a media file purchase from service 362 is received and stored. FIG. 4E illustrates operations of ringtone push server 116 and media purchase service 362. At step 428 a purchase request is received from a device. At step 430 a purchase is conducted and at step 434 a media file is sent to the device.

Figure 5:
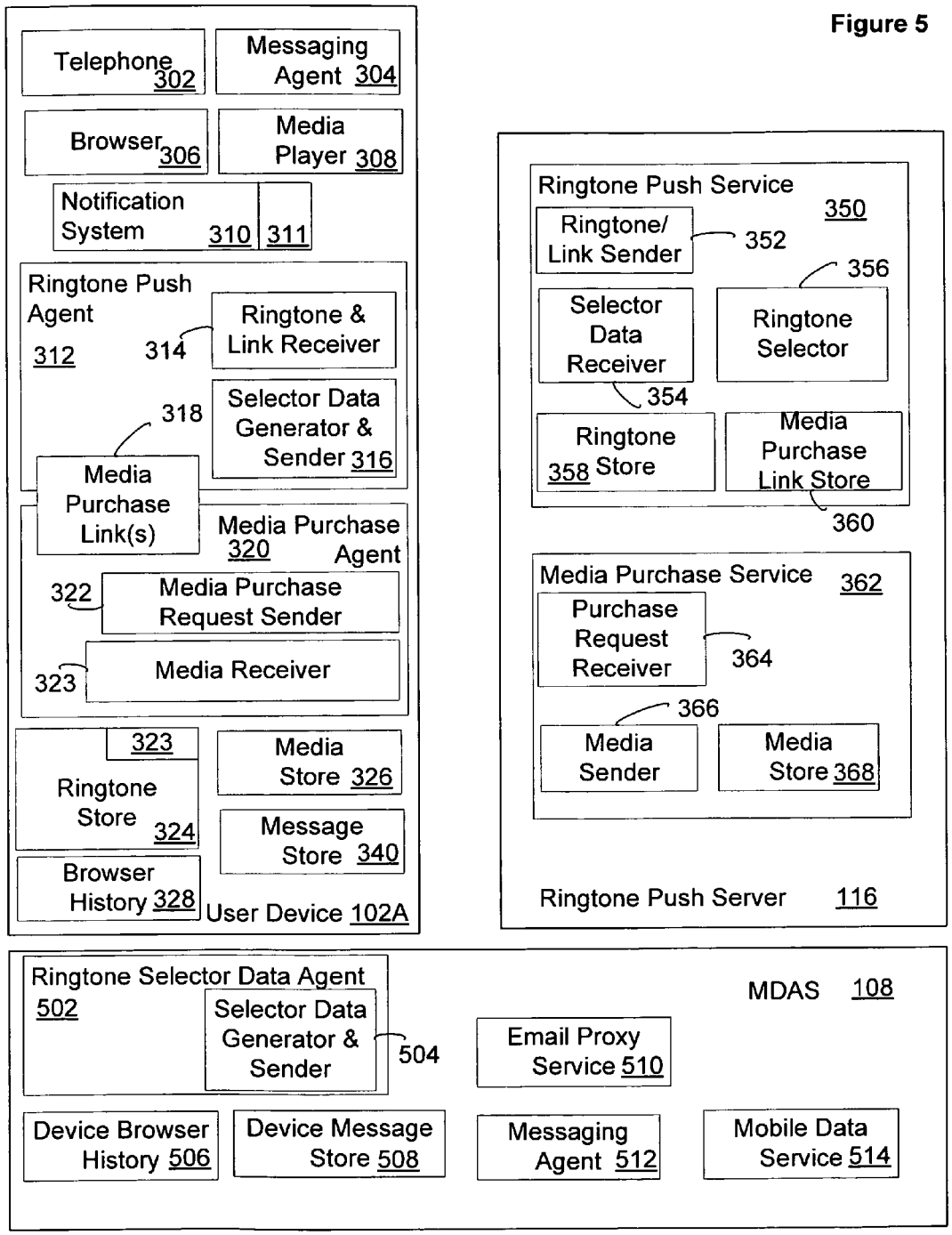
FIG. 5 is a block diagram of components of the communication network of FIG. 1 showing logical components and data for operations of a ringtone push system in accordance with another embodiment thereof.

FIG. 5 is a block diagram of components of the communication network of FIG. 1 showing logical components and data for operations of a ringtone push service in accordance with another embodiment thereof. In FIG. 5, a simplified MDAS 108 is shown in addition to device 102A and ringtone server 116 of FIG. 3. MDAS 108 comprises an email proxy service 510 and messaging agent 512 for facilitating email communications for and on behalf of user device 102A. MDAS comprises a mobile data service module providing data services such as proxy and gateway services for network browsing. As such, data communications such as email and internet (or other network) browsing are facilitated through MDAS 108. MDAS may store user data (e.g. 506 and 508) on behalf of device 102.

MDAS comprises a ringtone selector data agent 502 comprising a selector data generator and sender 504. Similarly to selector data generator and sender 316 of device 102A, MDAS selector data generator and sender 502 may examine user data (in stores 506 and 508) on behalf of a device to generate and send selector data to ringtone push service 350. Though not shown, MDAS may receive and forward ringtones and media purchase links (e.g. URLs) to respective devices.

Figure 6A:
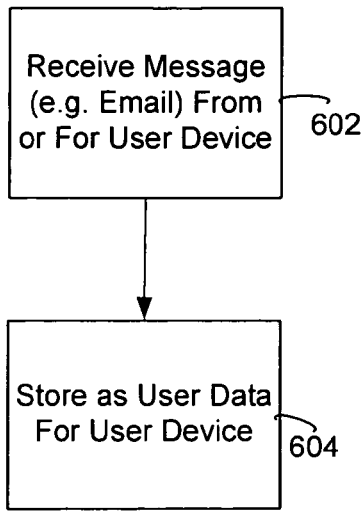
FIGS. 6A-6D are flow charts of operations of the ringtone push system of FIG. 5 in accordance with an embodiment.
Figure 6B:
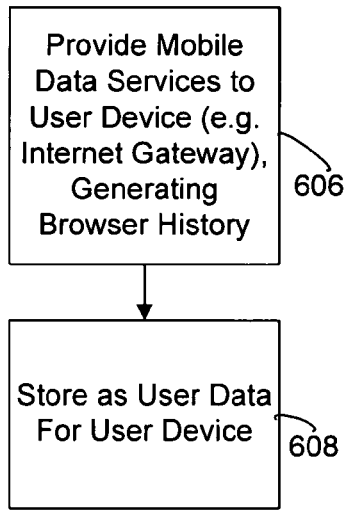

Selected operations in accordance with the embodiment of FIG. 5 are shown in FIGS. 6A to 6D. FIGS. 6A and 6B illustrate user data operations of MDAS 108. At step 602 an email message is received from or for delivery to device 102A. At step 604, the email is stored as user data in association with the device (e.g. to differentiate from email of other devices). At step 606 mobile data services are provided to device 102A to facilitate browsing of a network and generating browser history for the device. At step 608 the history is stored as user data on behalf of (i.e. in association with) the device 102A.

Figure 6C:
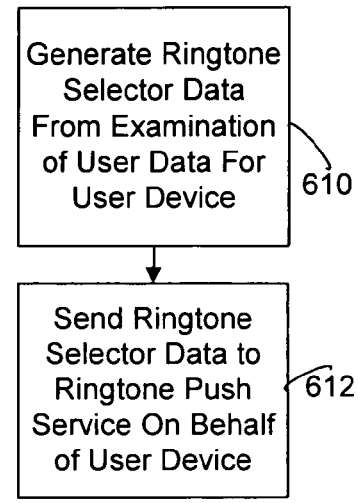
Figure 6D:
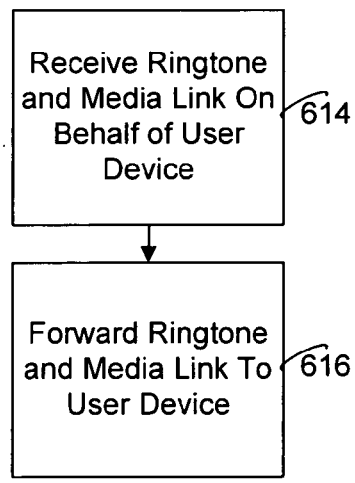

FIG. 6C illustrates operations of MDAS 108. At step 610, ringtone selector data is generated from a device's user data. Associated profile or other predictive data, metadata etc. may be generated and persisted for building a prediction model or for examining other user data. At step 612 the ringtone selector data is provided to the push service 350 on behalf of the device. The selector data communication to the service 350 may include a reference to be returned with the ringtone to associate the ringtone with the respective device and facilitate forwarding the ringtone appropriately. FIG. 6D illustrates operations of MDAS 108 to receive (step 614) and forward (step 616) a ringtone and media link for a respective device.

Particularly but not necessarily exclusively in the context of MDAS 108, user data need not be stored before it is examined. For example, MDAS 108 may examine user data for a user device in association with other operations such as receiving or forwarding the user data.

Although specific embodiments have been described herein, variations may be made thereto. Though described with reference to wireless communication devices, similar operations may be performed for wired communication devices such as appropriately configured desktop computers, telephone handsets, etc. Though described primarily with respect to wireless communication networks under the control of a carrier, such as a cellular network, other wireless networks may be employed.

The invention claimed is:

1. A method of communicating ringtones to a communication device comprising:
    sending ringtone selector data from the communication device to a ringtone service at a ringtone server, said selector data generated from operational data associated with the communication device; and
    receiving a predicted likely desirable ringtone at the communication device, the predicted likely desirable ringtone determined by applying the ringtone selector data in association with a prediction model to predict a likely desirable ringtone based on a highest score rating, the prediction model at least partly based on a history of web pages browsed at the communication device.

2. The method of claim 1 comprising receiving a media purchase link in association with the ringtone for assisting with a purchase of a media file.

3. The method of claim 2 comprising using the media purchase link to purchase and receive the media file.

4. The method of claim 1 comprising generating the ringtone selector data.

5. The method of claim 4 wherein the communication device comprises a wireless communication device configured for receiving data services from a communication network.

6. The method of claim 1 wherein the communication device comprises a wireless communication device and wherein the method comprises receiving the ringtone via a wireless network in accordance with a push communication.

7. A communication device for receiving ringtones from a ringtone service, the communication device comprising:
   a processor and a memory coupled thereto, said memory storing instructions and data configuring the processor to:
   send ringtone selector data from the communication device to a ringtone service at a ringtone server, said selector data generated from operational data associated with the communication device; and
   receive a predicted likely desirable ringtone at the communication device, the predicted likely desirable ringtone determined by applying the ringtone selector data in association with a prediction model to predict the likely desirable ringtone based on a highest score rating, the prediction model at least partly based on a history of web pages browsed at the communication device.

8. The communication device of claim 7 wherein the processor is configured to receive a media purchase link in association with the ringtone for assisting a purchase of a media file.

9. The communication device of claim 8 wherein the processor is configured to use the media purchase link to purchase and receive the media file.

10. The communication device of claim 8 wherein the processor is configured to generate the ringtone selector data.

11. The communication device of claim 10 wherein generating the ringtone selector data comprises selecting the operational data associated with the communication device data from which to make implicit observations of user behavior for predicting the user's behavior in relation to a particular ringtone.

12. The communication device of claim 7 wherein the processor is configured to generate notifications of communication device events in accordance with at least one notification profile; and use the ringtone to generate a notification in accordance with the at least one profile.

13. A computer program product storing instructions and data, which when executed, configure a processor for:
   sending ringtone selector data from the communication device to a ringtone service at a ringtone server, said selector data generated from operational data associated with the communication device; and
   receiving a predicted likely desirable ringtone at the communication device, the predicted likely desirable ringtone determined by applying the ringtone selector data in association with a prediction model to predict a likely desirable ringtone based on a highest score rating, the prediction model at least partly based on a history of web pages browsed at the communication device.

\* \* \* \* \*